(12) United States Patent
Shah et al.

(10) Patent No.: US 11,321,214 B1
(45) Date of Patent: *May 3, 2022

(54) DETECTION OF ANOMALOUS COMPUTER BEHAVIOR

(71) Applicant: STATE FARM MUTUAL AUTOMOBILE INSURANCE COMPANY, Bloomington, IL (US)

(72) Inventors: Rajiv Shah, Bloomington, IL (US); Shannon Morrison, Gilbert, AZ (US); Jeremy Cunningham, Bloomington, IL (US); Taylor Smith, Addison, TX (US); Sripriya Sundararaman, Plano, TX (US); Jing Wan, Allen, TX (US); Jeffrey Hevrin, Bloomington, IL (US); Ronald Duehr, Normal, IL (US); Brad Sliz, Normal, IL (US); Lucas Allen, East Peoria, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,821

(22) Filed: Oct. 12, 2020

Related U.S. Application Data

(63) Continuation of application No. 16/266,447, filed on Feb. 4, 2019, now Pat. No. 10,824,535, which is a
(Continued)

(51) Int. Cl.
*G06F 11/00* (2006.01)
*G06F 11/34* (2006.01)
*G06F 11/30* (2006.01)

(52) U.S. Cl.
CPC ...... *G06F 11/3452* (2013.01); *G06F 11/3006* (2013.01)

(58) Field of Classification Search
CPC .................. G06F 11/3452; G06F 11/3006
(Continued)

(56) References Cited

U.S. PATENT DOCUMENTS 7,944,822 B1   5/2011   Nucci et al.
8,533,533 B2   9/2013   Schneider
(Continued)

OTHER PUBLICATIONS

O. Vallis, J. Hochenbaum, and A. Kejariwal. A Novel Technique for Long-Term Anomaly Detection in the Cloud, 6th USENIX Workshop on Hot Topics in Cloud Computing, Philadelphia, PA, 2014.
(Continued)

*Primary Examiner* — Sarai E Butler
(74) *Attorney, Agent, or Firm* — Faegre Drinker Biddle & Reath LLP

(57) ABSTRACT

A computer-implemented method for determining features of a dataset that are indicative of anomalous behavior of one or more computers in a large group of computers comprises (1) receiving log files including a plurality of entries of data regarding connections between a plurality of computers belonging to an organization and a plurality of websites outside the organization, each entry being associated with the actions of one computer, (2) executing a time series decomposition algorithm on a portion of the features of the data to generate a first list of features, (3) implementing a plurality of traffic dispersion graphs to generate a second list of features, and (4) implementing an autoencoder and a random forest regressor to generate a third list of features.

20 Claims, 8 Drawing Sheets

Related U.S. Application Data continuation of application No. 15/643,757, filed on Jul. 7, 2017, now Pat. No. 10,248,533.

(60) Provisional application No. 62/384,480, filed on Sep. 7, 2016, provisional application No. 62/360,748, filed on Jul. 11, 2016.

(58) Field of Classification Search
USPC ..................................................... 714/1–57
See application file for complete search history.

(56) References Cited

U.S. PATENT DOCUMENTS

| | | |
|---|---|---|
| 8,832,804 B1 | 9/2014 | Casey et al. |
| 9,043,329 B1 | 5/2015 | Patton et al. |
| 10,459,827 B1* | 10/2019 | Aghdaie ................. A63F 13/67 |
| 2003/0028856 A1* | 2/2003 | Apuzzo ............... G06F 11/3696 |
| | | 717/124 |
| 2003/0167423 A1* | 9/2003 | Murakami ............ G06F 11/368 |
| | | 714/38.14 |
| 2009/0198559 A1* | 8/2009 | Wang ................ G06Q 30/0236 |
| | | 705/7.31 |
| 2011/0154126 A1* | 6/2011 | Park ........................ H04L 1/203 |
| | | 714/47.3 |
| 2014/0156649 A1* | 6/2014 | Bhattacharjee ... G06F 16/24578 |
| | | 707/723 |
| 2015/0112636 A1 | 4/2015 | Grichnik et al. |
| 2015/0186497 A1* | 7/2015 | Patton ..................... G06F 16/27 |
| | | 707/740 |
| 2016/0034327 A1* | 2/2016 | Kim ........................ G11C 16/10 |
| | | 714/37 |
| 2016/0147583 A1* | 5/2016 | Ben Simhon ........... H04L 43/16 |
| | | 714/47.3 |
| 2016/0253232 A1* | 9/2016 | Puri ..................... G06F 21/552 |
| | | 714/37 |
| 2016/0378460 A1 | 12/2016 | Chiou et al. |
| 2016/0380819 A1 | 12/2016 | Burger |
| 2017/0126709 A1 | 5/2017 | Baradaran et al. |
| 2017/0134404 A1 | 5/2017 | Machlica et al. |

OTHER PUBLICATIONS

L Akoglu. Oddball: Mining and Modeling Real-world Networks: Patterns, Anomalies, and Tools, pp. 104-128, 2010.

M. Illiofotou, P.Pappu, M.Faloutsos, M.Mitzenmacher, S.Singh, G.Varghese. Network Traffic Analysis using Traffic Dispersion Graphs (TDGs): Techniques and Hardware Implementation. 2007.

N.A. James, A. Kejariwal, and D.S. Matteson Leveraging Cloud Data to Mitigate User Experience from "Breaking Bad", arXiv preprint arXiv:1411.7955, 2014.

* cited by examiner

DETECTION OF ANOMALOUS COMPUTER BEHAVIOR

CROSS-REFERENCE TO RELATED APPLICATIONS

The present application is a continuation of, and claims the benefit of, U.S. patent application Ser. No. 16/266,447, filed Feb. 4, 2019 and entitled "DETECTION OF ANOMALOUS COMPUTER BEHAVIOR", which is a continuation of, and claims the benefit of, U.S. patent application Ser. No. 15/643,757, filed Jul. 7, 2017 and entitled "DETECTION OF ANOMALOUS COMPUTER BEHAVIOR", which claims priority benefit, with regard to all common subject matter, of U.S. Provisional Application No. 62/360,748, entitled "DETECTION OF ANOMALOUS COMPUTER BEHAVIOR", and filed Jul. 11, 2016, and U.S. Provisional Application No. 62/384,480, entitled "DETECTION OF ANOMALOUS COMPUTER BEHAVIOR", and filed Sep. 7, 2016. The listed earlier-filed applications are hereby incorporated by reference in their entireties into the current application.

FIELD OF THE INVENTION

The present disclosure generally relates to computing devices and computer-implemented methods for detecting anomalous behavior of one or more computers in a large group of computers.

BACKGROUND

Corporations, government offices, universities, colleges, and other organizations may have a large number of computers and file servers that are networked together. Typically, these computers have access to websites on the Internet via proxy servers and firewall servers. Occasionally, one or more computers attempts to access a website which is unexpected, not approved, or nonexistent. This anomalous behavior may be the result of activity of the computer user, malware, viruses, or bots (Internet or web robots) on the machine, computer hardware, firmware, or software misconfiguration, or other circumstances. Scanning a computer's hard drive and memory for malware, viruses, and bots may detect some malicious programs, but a scanner can only detect programs of which it is aware, so new malware or viruses may not be detected. And, scanning a computer's hard drive and memory for malware and viruses typically does not detect hardware, firmware, or software misconfigurations. Thus, some anomalous behavior, particularly resulting from misconfigurations, may go undetected.

BRIEF SUMMARY

Embodiments of the present technology relate to computer-implemented methods, computing devices, and computer-readable media for determining features of a dataset that are indicative of anomalous behavior of one or more computers in a large group of computers. In a first aspect, a computer-implemented method for determining features of a dataset that are indicative of anomalous behavior of one or more computers in a large group of computers may be provided. The method may include, via one or more processors and/or transceivers: (1) receiving log files including a plurality of entries of data regarding connections between a plurality of computers belonging to an organization and a plurality of websites outside the organization, each entry being associated with the actions of one computer; (2) determining a plurality of embedded features that are included in each entry; (3) determining a plurality of derived features that are extracted from the embedded features; (4) creating a plurality of features including the embedded features and the derived features; (5) executing a time series decomposition algorithm on a portion of the features of the data to generate a first list of features; (6) implementing a plurality of traffic dispersion graphs to generate a second list of features; and/or (7) implementing an autoencoder and a random forest regressor to generate a third list of features. The method may include additional, fewer, or alternative actions, including those discussed elsewhere herein.

In another aspect, a computer-readable medium for determining features of a dataset that are indicative of anomalous behavior of one or more computers in a large group of computers may be provided. The computer-readable medium may include an executable program stored thereon, wherein the program instructs a processing element of a computing device to perform the following: (1) receiving log files including a plurality of entries of data regarding connections between a plurality of computers belonging to an organization and a plurality of websites outside the organization, each entry being associated with the actions of one computer; (2) determining a plurality of embedded features that are included in each entry; (3) determining a plurality of derived features that are extracted from the embedded features; (4) creating a plurality of features including the embedded features and the derived features; (5) executing a time series decomposition algorithm on a portion of the features of the data to generate a first list of features; (6) implementing a plurality of traffic dispersion graphs to generate a second list of features; and/or (7) implementing an autoencoder and a random forest regressor to generate a third list of features. The program stored on the computer-readable medium may instruct the processing element to perform additional, fewer, or alternative actions, including those discussed elsewhere herein.

In yet another aspect, a computing device for determining features of a dataset that are indicative of anomalous behavior of one or more computers in a large group of computers may be provided. The computing device may include a communication element, a memory element, and a processing element. The communication element may receive and transmit communications to and from a plurality of servers and computers within an organization. The memory element may be electronically coupled to the communication element and may store executable instructions. The processing element may be electronically coupled to the communication element and the memory element. The processing element may be configured to receive log files including a plurality of entries of data regarding connections between a plurality of computers belonging to an organization and a plurality of websites outside the organization, each entry being associated with the actions of one computer; determine a plurality of embedded features that are included in each entry; determine a plurality of derived features that are extracted from the embedded features; create a plurality of features including the embedded features and the derived features; execute a time series decomposition algorithm on a portion of the features of the data to generate a first list of features; implement a plurality of traffic dispersion graphs to generate a second list of features; and/or implement an autoencoder and a random forest regressor to generate a third list of features. The computing device may include additional, fewer, or alternate components and/or functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of computing devices and computer implemented methods disclosed therein. It should be understood that each Figure depicts an embodiment of a particular aspect of the disclosed computing devices and computer implemented methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
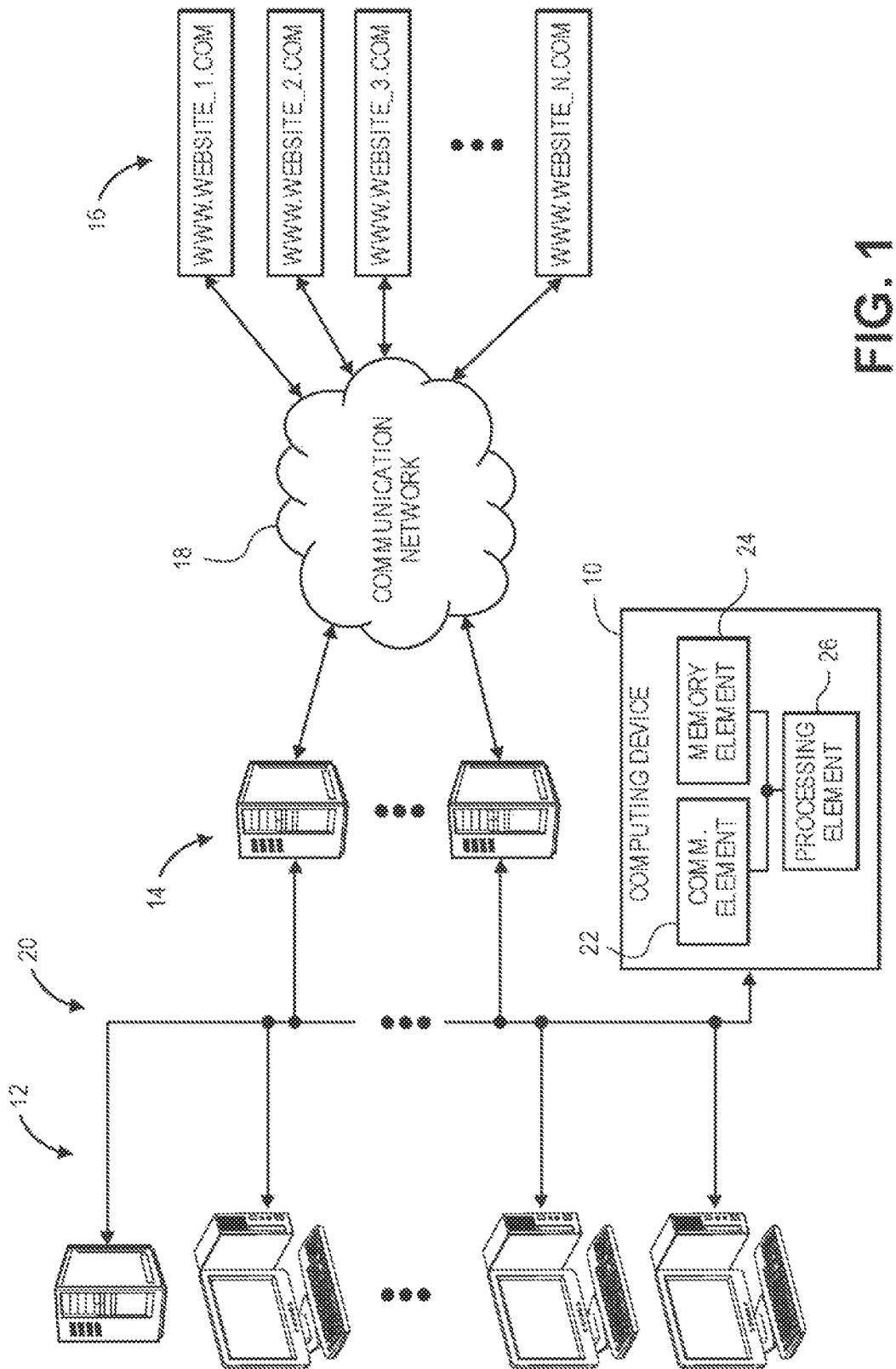
FIG. 1 illustrates an exemplary environment in which embodiments of a computing device for detecting anomalous computer behavior may operate, the exemplary environment including a plurality of computers belonging to an organization, a plurality of proxy servers and firewall servers, a communication network, and a plurality of web sites.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments address a computer-centric challenge or problem with a solution that is necessarily rooted in computer technology and may relate to, inter alia, computing devices and computer implemented methods for detecting anomalous behavior of one or more computers in a large group of computers. The embodiments may be utilized by organizations, such as corporations, government offices, universities, colleges, or the like, which have a large number of computers (including laptop, desktop, and workstation types of computers), file servers, mail servers, etc., collectively known as "computers," that are networked together. The computers may connect to the Internet through proxy servers and firewall servers in order to access websites. The proxy and firewall servers may keep one or more logs of data regarding the traffic that flows through the servers. For example, each proxy server may record operational information, such as an entry in a log file, or database, each time a computer sends data to or receives data from a website, which is not part of the organization.

Each firewall server may also record operational information, such as an entry in a log, or database, each time a request to access a restricted website by a computer is blocked. The entries in the proxy server logs may be similar in format to the entries in the firewall server logs and each entry may include data fields such as a timestamp when a message or packet was received by one of the servers, an Internet Protocol (IP) address for the computer within the organization, a uniform resource locator (URL) website name, a type of the URL, a length or character count of the message that was transmitted or blocked, whether the message was dropped or not, a port number on which the message was received, a port number used to transmit the message, the communication protocol of the message, an operating system of the computer transmitting the message, a location in which the computer resides, and so forth. Exemplary log files may include from approximately 80 to 100 data fields for each entry.

Each data field may also be considered a feature or variable. In addition, a feature may include a combination of two or more data fields. Furthermore, some features may be derived from the data fields. For example, day of week, hour of day, am/pm, etc. may be derived from the timestamp data field.

The data log files may be recorded by the proxy and firewall servers over a certain time period, such as a day, a week, or a month. At such a time, the log files may include hundreds of millions to hundreds of billions of entries. The servers may then transmit the log files to a computing device configured to perform an analysis to detect anomalies in the behavior of the computers. The analysis may include a plurality of algorithms or processes for determining the features which are more indicative of anomalous computer behavior. A seasonal hybrid extreme studentized deviates (S-H-ESD) algorithm may be executed on time-based features for each of a plurality of time periods for each of the computers.

A first list of features may be created based upon a probability that a particular feature for a particular computer may be anomalous. A breakout detection algorithm, such as e-divisive with medians, may be executed for each time-based feature for each computer on the data for a longer period of time, such as one month. A second list of features may be created based upon a probability that a breakout on a particular computer occurred. A plurality of traffic dispersion graphs may be created to display the connections between the computers and websites contacted by each computer for shorter time periods. Features may be derived from the graphs which can be statistically evaluated. A third list of features may be created to include those features for which non-trivial or significant results have been determined. An autoencoder in combination with a random forest regressor may also be implemented to find and rank features that include anomalous data. The autoencoder may determine one or more features for each entry of the data logs which possibly are anomalous, and the random forest regressor may determine a ranking of the features which are more anomalous.

Once the potentially anomalous features are determined, then a plurality of other processes may be implemented to determine specific computers with anomalous behavior. K-means clustering may be implemented to determine the centroids of a plurality of clusters of points for at least a portion of the features indicated as including anomalous data. The points which are farthest away from the centroids may be the input to a density-based spatial clustering of applications with noise (DBSCAN) algorithm. DBSCAN may determine outlier data points that do not meet the constraints of the algorithm, wherein each data point represents a particular computer. A plurality of egonet graphs may be created wherein each graph may include a plurality of nodes, with each node representing a computer or a website, and a plurality of weighted edges, with each edge being drawn from a computer to a website which the computer contacted within a certain time period. Accompanying each egonet graph, a "Heavy Vicinity" plot and a "Dominant Edge" plot are created. From these plots, outlier points may be determined, wherein each point corresponds to a computer whose behavior may be anomalous.

An autoencoder may be implemented to determine the computers which are behaving anomalously. The autoencoder may encode and then decode a plurality of entries of the data log files. The entries may include a small number of specific entries associated with features that were determined above. The autoencoder also calculates an error level for each entry undergoing the coding/decoding process. Each entry is generated by a particular computer. Those computers generating entries having high error levels are likely behaving anomalously. All of the computers determined as outliers or exhibiting anomalous behavior may be forwarded to system administrators to be investigated.

Exemplary Computing Device

FIG. 1 depicts an exemplary environment in which embodiments of a computing device 10 for detecting anomalous behavior of one or more computers in a large group of computers may be utilized. The environment may include a plurality of computers 12, a plurality of servers 14, a plurality of websites 16, and a communication network 18. The computers 12 and the servers 14 may be located within the network boundaries of a large organization, such as a corporation, a government office, a university, a college, or the like. That is, the computers 12 and servers 14 may all be connected to an internal network 20 of the organization. The communication network 18 and the websites 16 may be external to the organization. The computing device 10 may detect anomalous behavior of the computers 12 based upon interaction between the computers 12 and the websites 16.

The computers 12 may include tablet computers, laptop computers, desktop computers, workstation computers, smart phones, smart watches, and the like. The computers 12 may also include file servers and mail servers. In addition, the computers 12 may include copiers, printers, and any other device that can connect to the internal network 20. Each computer 12 may include a processor and memory, as are known, along with circuitry or an adapter capable of wired or wireless communication with the internal network 20. Furthermore, each computer 12 may include software, such as a web browser or automated software that does not necessarily include a graphical user interface (GUI), which is capable of contacting a website 16. Normal computer behavior may include users (employees of the organization) surfing the web, sending email, doing research that includes retrieving information from websites, placing orders on business websites, or similar activities. Normal behavior may also include machines, such as copiers or printers, automatically reporting data on usage of resources, such as toner and paper, as part of an automated supply process. Anomalous computer behavior may include a computer contacting a website that no other computer is contacting, a computer suddenly transmitting a large amount of data to a website, a computer attempting to contact a website that does not exist, and so forth. Anomalous behavior may be the result of malware residing and operating on a computer, a misconfiguration of a computer, software in need of updating, or similar circumstances.

The servers 14 may include a plurality of proxy servers and a plurality of firewall servers, as are commonly known. Generally, the servers 14 act as a bridge between the internal network 20 of the organization and the communication network 18 of the outside world. And, all data communication traffic between the internal network 20 and the communication network 18 passes through the servers 14. Typically, the servers 14 record information regarding the transaction of data that they handle. For example, every time a computer 12 attempts to send data to a website 16 and every time a computer 12 receives data from a website 16, the servers 14 handle the transaction and record information about it. The information may include items and parameters such as a timestamp of the transaction, a source Internet protocol (IP) address, a destination IP address, a source port, a destination port, a size of the data handled in the transaction (in units of bytes), a protocol of the data, a geographic location of the computer 12 involved in the transaction, a type of computer 12 involved, an operating system of the computer involved, a domain name of the website involved, a type of website involved, whether or not contact with the website was allowed, and so forth. The information may be stored in one or more log files, wherein the information about each transaction is stored as an entry in the log file and each piece of information recorded is a field in the entry. The log file may also be considered a large table of data with each entry being a row of data and each field being a column of data. In an exemplary log file, or combination of log files, there may be up to approximately 100 fields or columns and hundreds of millions to hundreds of billions of entries or rows of data.

Each website 16 may include one or more pages of data and/or multimedia content accessed through the World Wide Web. Each website 16 may also be capable of conducting commerce, such as product sales, collecting data, or the like. Each website 16 may be hosted by or stored on a web server. The websites 16 may include top-level domains such as ".com", ".org", ".gov", and so forth. Typically, the websites 16 are accessed using software such as a web browser.

The communication network 18 generally allows communication between the servers 14 of the organization and the websites 16. The communication network 18 may include the Internet, cellular communication networks, local area networks, metro area networks, wide area networks, cloud networks, plain old telephone service (POTS) networks, and the like, or combinations thereof. The communication network 18 may be wired, wireless, or combinations thereof and may include components such as modems, gateways, switches, routers, hubs, access points, repeaters, towers, and the like. The servers 14 may connect to the communication network 18 either through wires, such as electrical cables or fiber optic cables, or wirelessly, such as RF communication using wireless standards such as cellular 2G, 3G, or 4G, Institute of Electrical and Electronics Engineers (IEEE) 802.11 standards such as WiFi, IEEE 802.16 standards such as WiMAX, Bluetooth™, or combinations thereof.

The computing device 10 may be embodied by a desktop computer, a workstation computer, or the like. The computing device 10 may also be embodied by, or make use of, multiprocessing, parallel processing, supercomputing, or multi-node systems. The computing device 10 may broadly comprise a communication element 22, a memory element 24, and a processing element 26.

The communication element 22 generally allows the computing device 10 to communicate with the servers 14 and the computers 12 of the internal network 20. The communication element 22 may include signal or data transmitting and receiving circuits, such as antennas, amplifiers, filters, mixers, oscillators, digital signal processors (DSPs), and the like. The communication element 22 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. In addition, the communication element 22 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 22 may establish communication through connectors or couplers that receive metal conductor wires or cables, like Cat 5 or coax cable, which are compatible with networking technologies such as ethernet. In certain embodiments, the communication element 22 may also couple with optical fiber cables. The communication element 22 may be in communication with the processing element 26 and the memory element 24.

The memory element 24 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 24 may be embedded in, or packaged in the same package as, the processing element 26. The memory element 24 may include, or may constitute, a "computer-readable medium". The memory element 24 may store the instructions, code, code segments, software, firmware, programs, applications, apps, services, daemons, or the like that are executed by the processing element 26. The memory element 24 may also store settings, data, documents, sound files, photographs, movies, images, databases, and the like.

The processing element 26 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 26 may generally execute, process, or run instructions, code, code segments, software, firmware, programs, applications, apps, processes, services, daemons, or the like. The processing element 26 may also include hardware components such as finite-state machines, sequential and combinational logic, and other electronic circuits that can perform the functions necessary for the operation of the current invention. The processing element 26 may be in communication with the other electronic components through serial or parallel links that include universal busses, address busses, data busses, control lines, and the like.

Through hardware, software, firmware, or various combinations thereof, the processing element 26 may be configured to perform the following operations. The computing device 10 may receive the log file or files, as described above, from the servers 14. The processing element 26 may determine a plurality of embedded features from the data in the log files. The embedded features may include each of the fields of the data in each entry of the log files. In addition, some embedded features may include combinations of two or more of the fields. Furthermore, the processing element 26 may derive features from the data. For example, the timestamp of the transaction may be recorded in a form that includes the date and the time of day as a single, combined unit. From the timestamp, the processing element 26 may determine features such as a day of week, an hour of day, AM/PM, etc. In various embodiments, the processing element 26 may also assign numeric values to the embedded and derived features that are text by default. For example, the values of the data protocol, the computer location, the computer type, and others may be stored as text. The processing element 26 may assign a unique numeric value to each unique text value for each field. The processing element 26 may create a plurality of features that includes the combination of the embedded features and the derived features. Once the data is properly prepared and formatted, the processing element 26 may determine which features are most likely to contain anomalous data by executing a plurality of algorithms or processes. The algorithms or processes may be executed in any order or may be executed at roughly the same time.

The processing element 26 may execute a seasonal hybrid extreme studentized deviates (S-H-ESD) algorithm on time-based features for each of a plurality of time periods for each of the computers 12. Time-based features may include a number of connections to websites 16 made or attempted per time period for each computer 12, a number of bytes sent or received for all of the transactions per time period by each computer 12, and the like. Exemplary time periods include a day, a week, a month, etc. In executing the S-H-ESD algorithm, the processing element 26 may perform the following steps for each feature for each computer 12 for each time period: determine the periodicity or seasonality component for all of the data of the time period; split the data into non-overlapping windows, and for each window: extract the seasonality component utilizing seasonal trend decomposition using loess (STL), compute the median, compute the residuals, and execute extreme studentized deviates with median absolute deviation (MAD). Execution of the S-H-ESD algorithm may generate one or more outlying values of data for each feature for each computer 12 for each time period, as well as the times at which the outlying data was recorded. The outlying values for all computers 12 may be compared to one another for each feature and time period combination. Alternatively, the outlying values for computers 12 in certain groups, such as specific file or mail servers, may be compared to one another.

The processing element 26 may calculate statistical parameters, such as a mean and a confidence interval for the outlying values for the computers 12 for each feature and time period combination. The processing element 26 may then calculate a p-value (based upon a z-score), to determine the deviation from the mean value for each computer 12 for each feature and time period combination. The processing element 26 may also calculate a first feature score as:

(1−p-value)×100, for each p-value that is calculated. The processing element 26 may generate a first list of features to include each feature associated with the first feature scores that are greater than a first threshold. Alternatively, the first list of features may include a fixed number of features, such as the top ten highest scoring features.

The processing element 26 may execute a breakout detection algorithm, such as e-divisive with medians, may be executed for each time-based feature for each computer 12 on the data for a period of time, such as one month. When executing the breakout detection algorithm, the processing element 26 may determine points in time where the data changes abruptly from one steady-state value to another steady-state value. For example, the processing element 26 may determine the times (including, for example, the date and hour), if any, at which the steady-state value of connections to websites 16 made or attempted by a particular computer 12 increased or decreased by a threshold amount. It is possible that some computers 12 will have no breakout activity. In addition or instead, the processing element 26 may determine or calculate a probability of whether a breakout of a certain feature has occurred on a given computer 12. The processing element 26 may generate a second list of features to include those features associated with a breakout probability greater than a second threshold. Alternatively, the second list of features may include a fixed number of features, such as the top ten features with the highest breakout probability.

Figure 2:
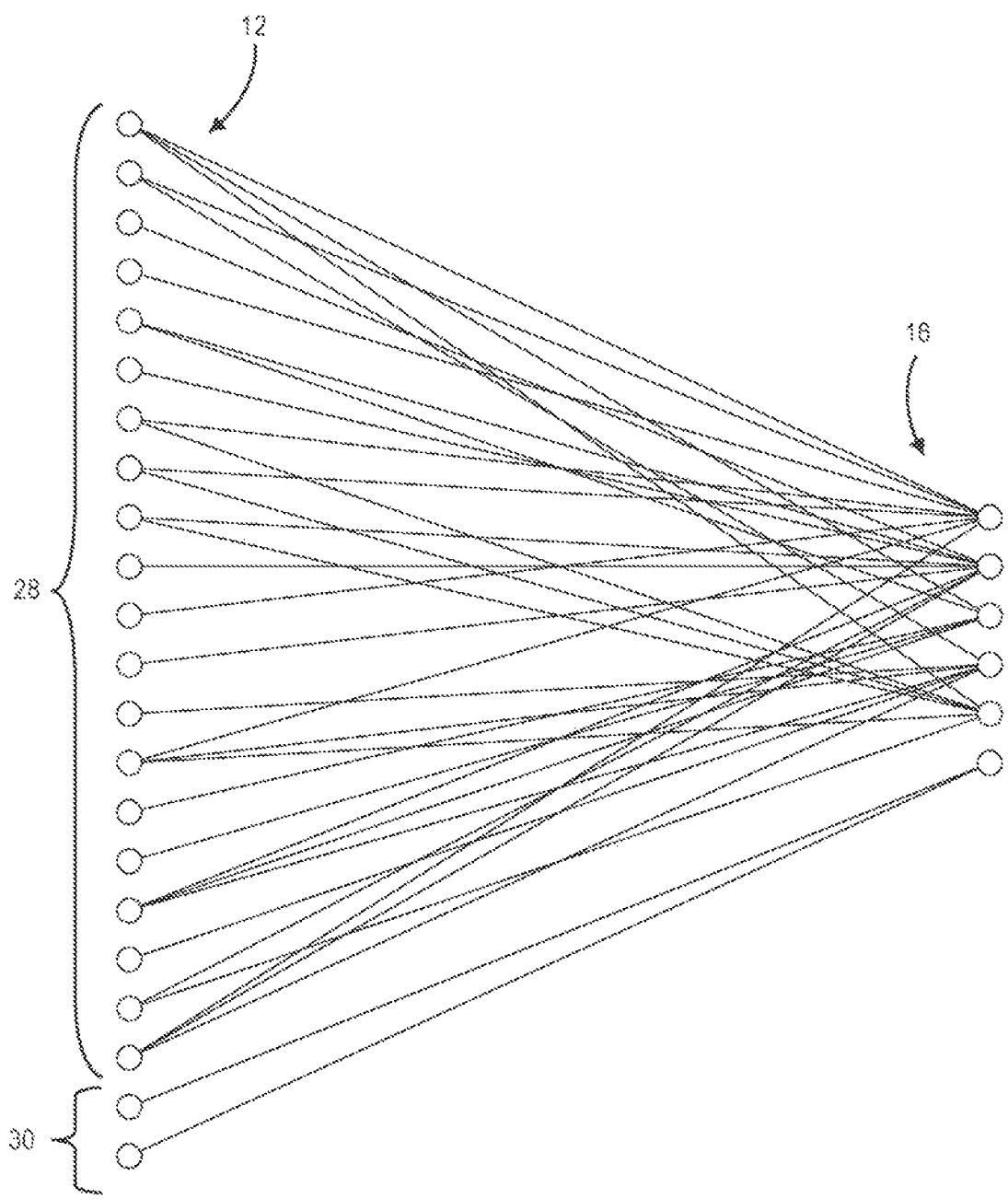
FIG. 2 illustrates an exemplary traffic dispersion graph which shows a first plurality of nodes representing computers and a second plurality of nodes representing websites.

The processing element 26 may create a plurality of traffic dispersion graphs to display the connections between the computers 12 and websites 16 contacted by each computer 12 for shorter time periods. In various embodiments, the processing element 26 may not actually render, draw, or plot the graphs on, say, a computer monitor, but may instead simply create the data structures from which the graphs could be rendered. Referring to the graph of FIG. 2, plotted for illustration purposes, each computer 12 and each website 16 may have a node on each graph. A line, or edge, may be drawn from each computer 12 to the website 16 the computer 12 tries to contact in a time period of, say, ten minutes, thirty minutes, an hour, or so forth. The processing element 26 may create one graph for each time period. Typically, most of the computers 12 contact one or more of a small group of websites 16. This combination of computers 12 and websites 16 forms a subgraph called a "giant connected component" 28. However, there is usually a small percentage of computers 12 that do not try to contact the websites 16 which belong to the giant connected component 28 and instead try to contact other websites 16, or perhaps do not contact any websites 16 at all. Each grouping of computers 12 and the websites 16 to which they are connected form a structure called a "non-GCC subgraph" 30. The traffic dispersion graph for each time period may include one giant connected component 28 and one or more non-GCC subgraphs 30, wherein there is one giant connected component 28 and one non-GCC subgraph 30.

After the data structures have been created, for which multiple traffic dispersion graphs could be plotted, the processing element 26 may determine data for features which are derived from the graphs. For example, the processing element 26 may determine the data for a first feature that includes a number of times a computer 12 is plotted in a non-GCC subgraph 30, which may be determined for each computer 12. The processing element 26 may determine the data for a second feature that includes an average size (number of nodes) of a non-GCC subgraph 30 for each graph. The processing element 26 may create a third list of features to include those features for which non-trivial, or significant, results have been determined. In the case of the first feature, if any of the computers 12 has been plotted in a non-GCC subgraph 30 more than a certain number of times, then the first feature may be included in the third list. In the case of the second feature, if the average size of the non-GCC subgraphs 30 for each graph is greater than a certain number, then the second feature may be included in the third list. The threshold for each feature to be included in the list may be different.

The processing element 26 may implement a first autoencoder to find features that include anomalous data. The first autoencoder includes one or more hidden layers, each layer including a plurality of nodes, which perform parallel computations to encode the data, usually so that the coded data has fewer values than the original data, and then decode the coded data in order to reconstruct the original data as closely as possible. An exemplary first autoencoder includes two hidden layers with twenty nodes each. An example of one of the computations for encoding may include: $z=\sigma_1(Wx+b)$, wherein z is a data point of the hidden layer, a is a first sigmoid function, W is a weight coefficient, x is the original data, and b is a bias value. An example of one of the computations for decoding may include: $x'=\sigma_2(W'z+b')$, wherein x' is a decoded data point, $\sigma_2$ is a second sigmoid function, W' is a weight coefficient, z is the encoded data, and b' is a bias value. W' and b' may be related to W and b, respectively, through matrix transpose or similar functions. In practice, each entry of the log file may be autoencoded, wherein each entry includes a portion of the total number of features. Thus, the first autoencoder tries to recreate the data of each feature or field of the entry by reading in the data from the log files, performing the calculations for coding the data, and then performing the calculations for decoding the data.

While implementing the first autoencoder, the processing element 26 may calculate an error level, such as a mean squared error, for each use of the first autoencoder, wherein the value of the error level varies according to the degree of similarity between the original data and the reconstructed data from the first autoencoder. That is, the processing element 26 may calculate an error level for the reconstruction of the data for each entry. Typically, a greater error level corresponds to a lower degree of similarity between the original data and the data from the first autoencoder that has been autoencoded. The error level is also an indication of anomalous behavior of one or more computers, wherein a value of the error level greater than a certain threshold indicates that the data had one or more anomalies. The processing element 26 may create a list of entries (or indices of entries) for which the error level of autoencoding the entry was greater than a certain threshold.

The processing element 26 may implement a random forest regressor that is configured to determine which features contributed to the error level values generated by the first autoencoder. The random forest regressor includes a plurality of decision trees, wherein each decision tree is configured to make a classification or a prediction. The random forest regressor may be used to predict the features that contributed the most to, or had the greatest influence on, the value of the error level determined by the first autoencoder for each entry of the log file that was implemented on the first autoencoder. The processing element 26 may execute the random forest regressor only on those entries whose error level is greater than a third threshold value. After executing the random forest regressor, the processing element 26 may produce a ranking of the features which contributed to the values of the error levels determined by the first autoencoder.

The processing element 26 may implement K-means clustering for at least a portion of the features indicated as including anomalous data from the methods discussed above. The processing element 26 may execute K-means clustering algorithm on the features from the first, second, third, or fourth lists of features and may involve plotting the data from the log files corresponding to the features. In various embodiments, the processing element 26 may not actually render, draw, or plot any data on, say, a computer monitor, but may instead simply create the data structures from which plots could be rendered. Examples of the features may include the type of computer 12, whether or not the first portion of the IP address of the computer 12 has a value of 10, whether or not the communication from the computer 12 to the website 16 was allowed, the IP address of the computer, the source port of the firewall or proxy server 14, the destination port of the firewall or proxy server 14, the protocol of the message, and so forth.

Figure 3:
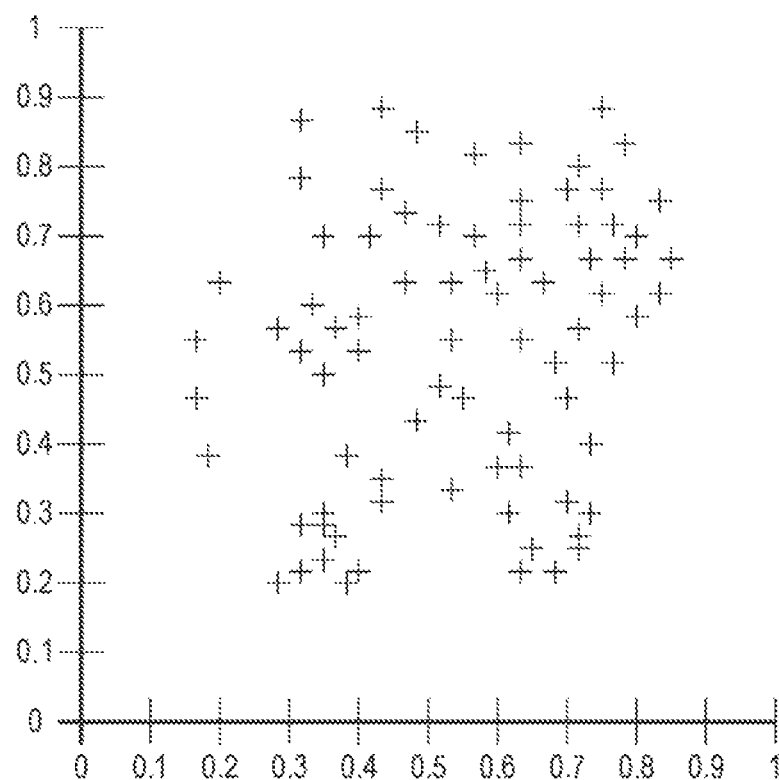
FIG. 3 illustrates an exemplary K-means clustering plot which shows a plurality of data points, with each data point representing a computer.

Typically, the processing element 26 processes the data corresponding to the features for a certain time period, such as an hour, a day, a week, etc. The processing element 26 may assign two-dimensional coordinates, such as (x, y), to the data of each feature to create a plurality of points. An example of a plot of the points resulting from the processing element 26 assigning coordinates to the data of each feature is shown in FIG. 3, wherein each data point is indicated with a plus sign. The processing element 26 may choose a number of clusters, wherein each cluster is associated with a centroid whose position within the data of the feature is chosen arbitrarily. Alternatively, the processing element 26 may choose the number of clusters utilizing an elbow method or an elbow graph.

The processing element 26 may determine which points are closest to each centroid and assigns those points to the centroid. The processing element 26 may then reposition each centroid to be in the center of the assigned points. Given that the centroids have moved, the processing element 26 may determine which points are closest to each newly-positioned centroid and assigns those points to the centroid. The processing element 26 may again reposition each centroid to be in the center of the newly-assigned points. The processing element 26 may repeat the repositioning and assigning process until the distance that each centroid is moved is less than a certain threshold. The processing element 26 may discard the points whose distance to each centroid is less than a threshold value.

The processing element 26 may input the remaining data points to a density-based spatial clustering of applications with noise (DBSCAN) algorithm. For each point, the processing element 26 determines how many other points lie within a threshold radius. The processing element 26 determines those points to be outliers whose distance to any other point is greater than the threshold radius or which do not have any other points within the threshold radius. Each data point represents a particular computer 12, and the outlier data points represent computers 12 whose behavior is anomalous. The processing element 26 may include those computers 12 in a first list of computers 12 whose behavior is anomalous.

The processing element 26 may create a plurality of egonet graphs for the data from the proxy server 14 log files. Each egonet graph may include a plurality of nodes 32, with each node 32 representing a computer 12 or a website 16, and a plurality of weighted edges 34, with each edge 34 being drawn from one computer 12 to one website 16 which the computer 12 contacted within a certain time period. An exemplary time period may be an hour or a day. An egonet 36 may include one node 32 and all of the edges 34 and other nodes 32 to which the first node 32 is connected, so that each egonet graph may include a plurality of egonets 36—one egonet 36 per node 32.

Figure 4:
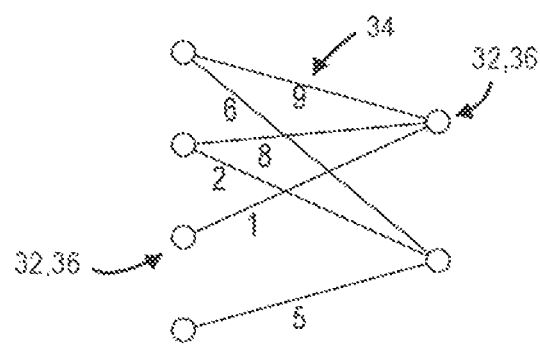
FIG. 4 illustrates an exemplary egonet graph which shows a first plurality of nodes representing computers, and a second plurality of nodes representing websites with weighted edges drawn therebetween.

The processing element 26 may create one egonet graph for each time period included in the proxy server log files. The weight of each edge 34 may equal or correspond to the number of blocked connections during the time period, although other parameters may be used such as the number of times the website 16 was contacted. In various embodiments, the processing element 26 may not actually render, draw, or plot the egonet graphs on, say, a computer monitor, but may instead simply create the data structures from which the graphs could be rendered. However, for the purposes of illustration, an exemplary egonet graph is shown in FIG. 4, wherein there are a plurality of nodes 32 and edges 34, with each edge having a weight indicated by a number. Furthermore, each node 32 and its connected edges 34 form one egonet 36 with some egonets 36 representing or being associated with each computer 12 and other egonets 36 representing or being associated with each website 16.

Figure 5:
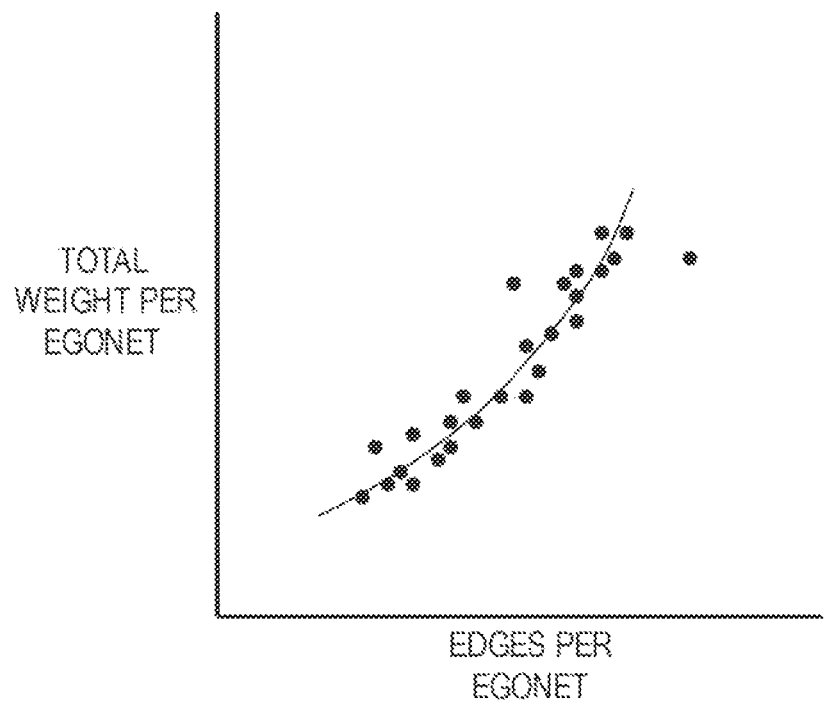
FIG. 5 illustrates an exemplary plot of total weight per egonet vs. edges per egonet with data points derived from the egonet graph of FIG. 4.
Figure 6:
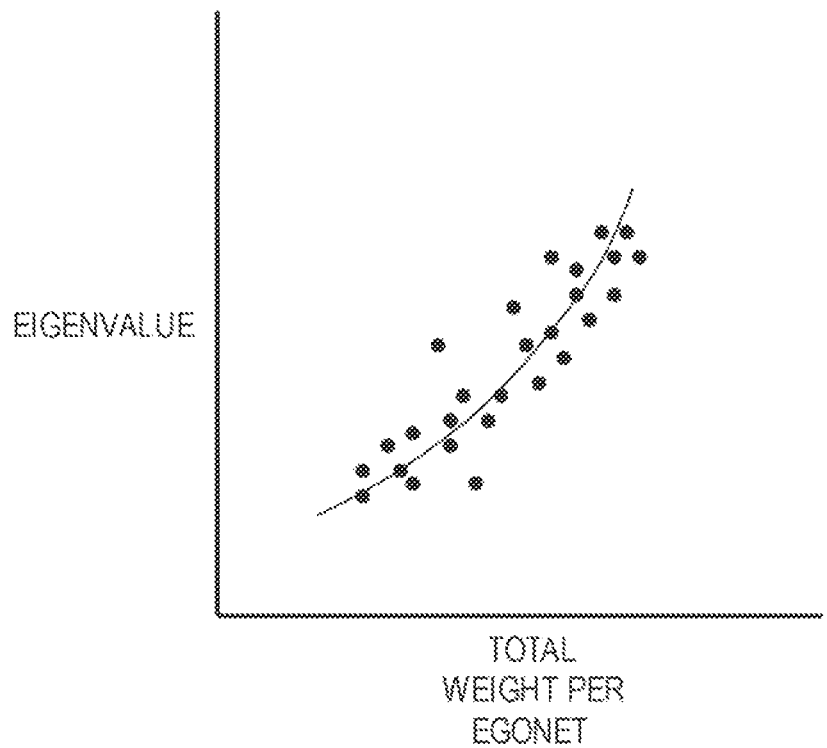
FIG. 6 illustrates an exemplary plot of eigenvalues vs. total weight per egonet with data points derived from the egonet graph of FIG. 4.
Figure 7A:
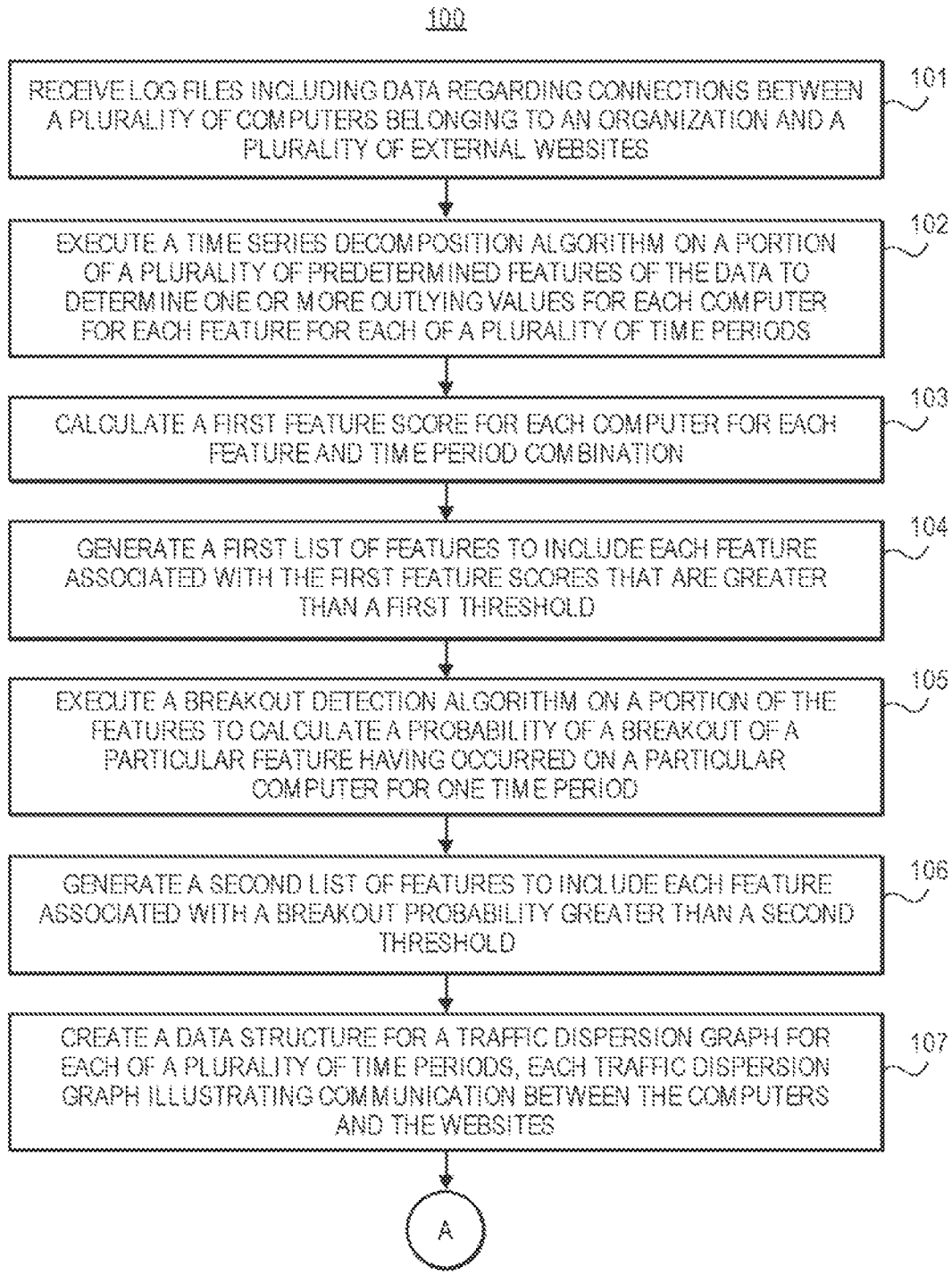
FIGS. 7A-7D illustrate at least a portion of the steps of an exemplary computer-implemented method for detecting anomalous computer behavior.
Figure 7B:
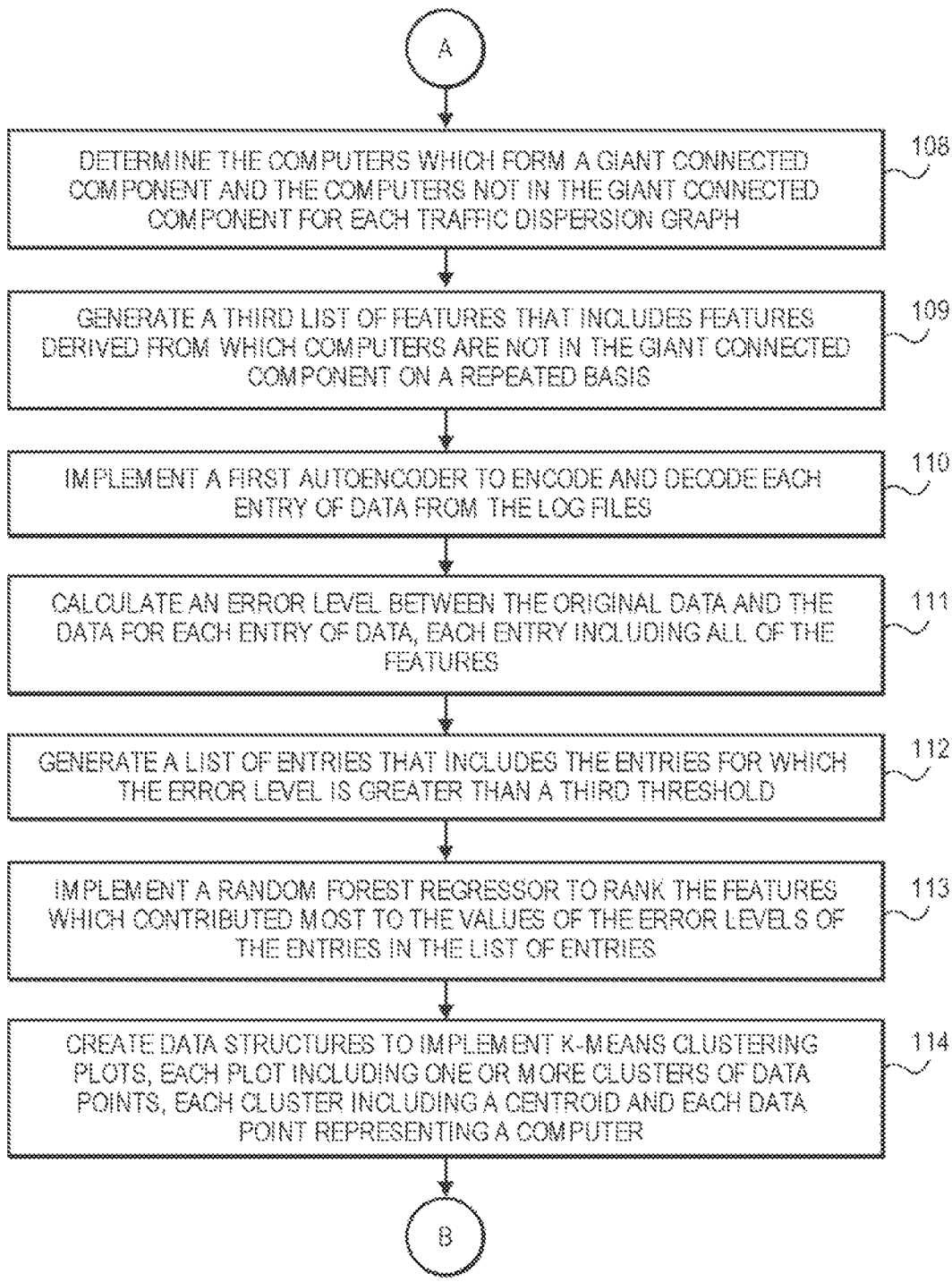
Figure 7C:
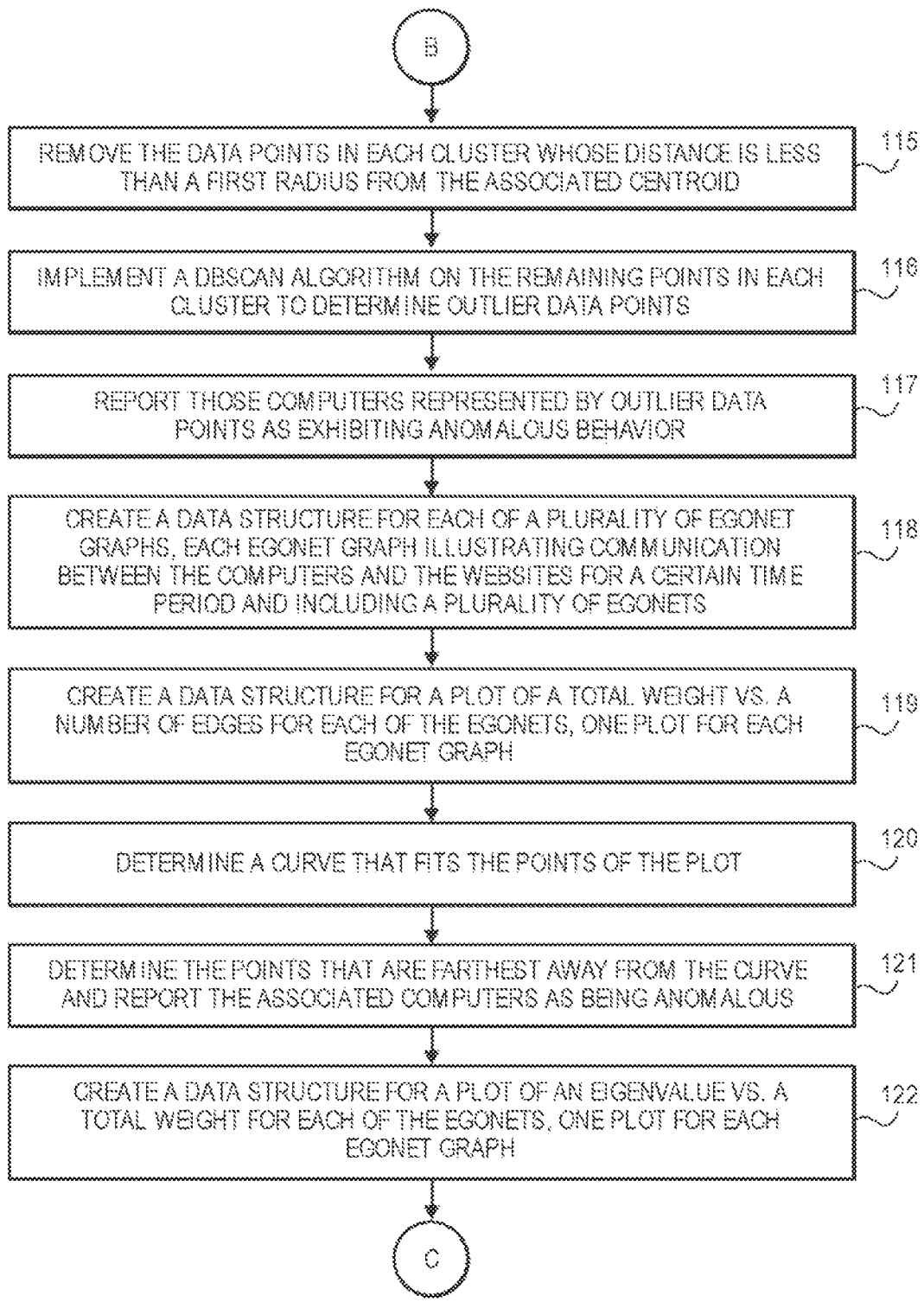
Figure 7D:
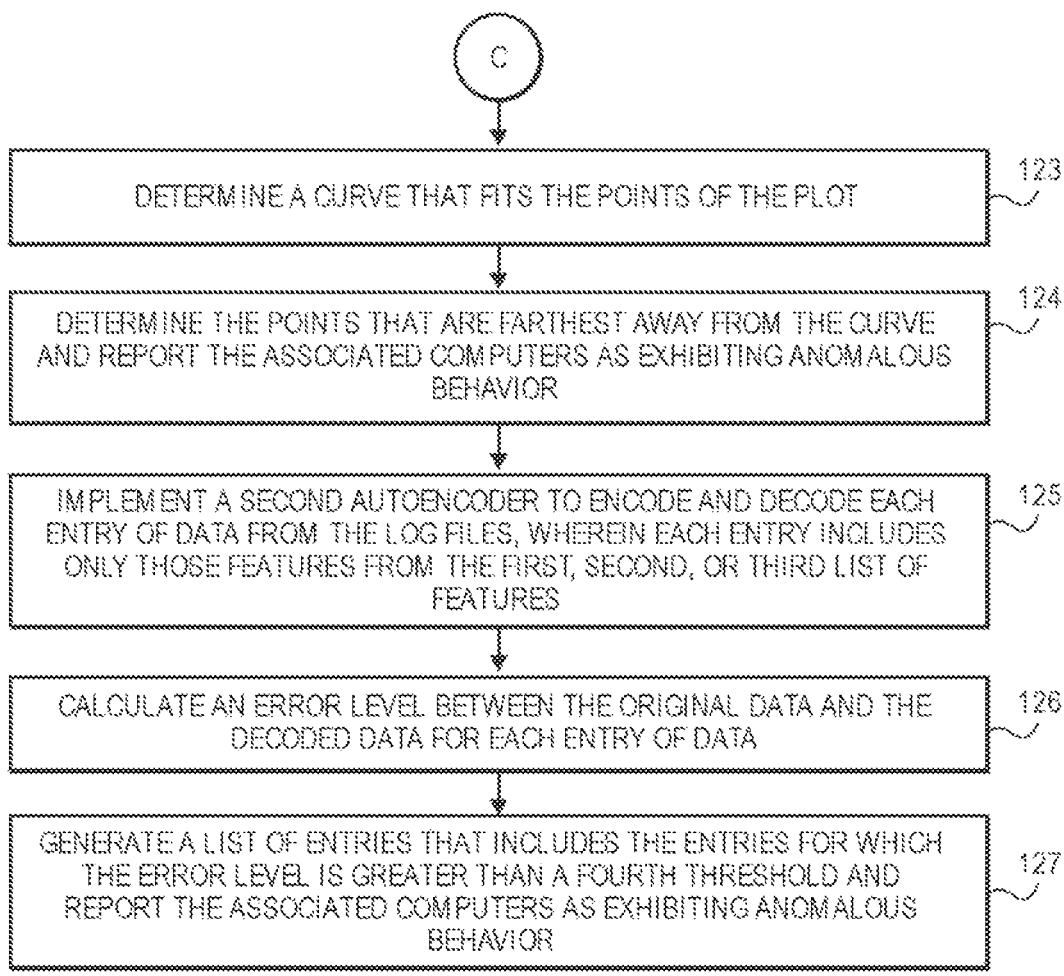

For each egonet of one egonet graph, the processing element 26 may determine a weighted adjacency matrix and may calculate an eigenvalue for each matrix. The processing element 26 may create a "Heavy Vicinity" plot and a "Dominant Edge" plot to accompany each egonet graph. The Heavy Vicinity plots the total weight vs. the number of edges for each egonet 36 representing a computer 12, as shown in the example of FIG. 5. The points that are plotted should form a power law curve. The processing element 26 may utilize a curve fitter to determine the shape and position of the curve. The processing element 26 may determine those points which are farthest away from the curve and may label or identify those points as outliers, wherein each point corresponds to a computer 12 whose behavior may be anomalous. The Dominant Edge plots the eigenvalue vs. the total weight for each egonet 36 representing a computer 12, as shown in the example of FIG. 6. Like the Heavy Vicinity plot, the points of the Dominant Edge plot should form a power law curve. The processing element 26 may again utilize a curve fitter to determine the shape and position of the curve. The processing element 26 may determine those points which are farthest away from the curve and may label or identify those points as outliers, wherein each point corresponds to a computer 12 whose behavior may be anomalous. The processing element 26 may create a second list to include the computers 12 determined as anomalous by the Heavy Vicinity and Dominant Edge plots. The second list may be forwarded to system administrators.

The processing element 26 may implement a second autoencoder to determine the computers 12 which may be behaving anomalously. The second autoencoder may have the same construction, such as hidden layers, etc., as the first autoencoder or it may have a different construction. The data that is input into the second autoencoder may include all, or most, of the entries of the data log files, except that each entry includes only the features that were from the first, second, or third lists of features generated by the processes discussed above. The entries may additionally or alternatively include only those features which were ranked by the random forest regressor as contributing to the values of the error levels determined by the first autoencoder.

The processing element 26 may implement the second autoencoder by reading the data, encoding the data, and then decoding the data. The processing element 26 may further calculate an error level for each entry that is encoded and decoded, wherein the error level corresponds to the similarity between the input data and the output data. The processing element 26 may determine which entries have an error level that is greater than a predetermined threshold may be considered as outliers. Since each entry is generated by, or associated with, a particular computer 12, the computers 12 associated with outlier entries are likely behaving anomalously. The processing element 26 may create a third list to include the computers 12 associated with outliers. The third list may be forwarded to system administrators.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary Computer-Implemented Method

FIGS. 7A-7D depicts a listing of steps of an exemplary computer-implemented method 100 for detecting anomalous behavior of one or more computers 12 in a large group of computers 12. The steps may be performed in the order shown in FIGS. 7A-7D, or they may be performed in a different order. Furthermore, some steps may be performed concurrently as opposed to sequentially. In addition, some steps may be optional. The steps of the computer-implemented method 100 may be performed by the computing device 10.

Generally, the method 100 comprises receiving log files including a plurality of entries of data regarding connections between a plurality of computers belonging to an organization and a plurality of websites outside the organization, each entry being associated with the actions of one computer and including a plurality of features; executing a first plurality of algorithms to determine a portion of the features which contribute to anomalous computer behavior; and executing a second plurality of algorithms utilizing the portion of features to determine the computers which are behaving anomalously. Specifically, the method 100 comprises the steps discussed below.

Referring to step 101, one or more log files are received, each log file including a plurality of entries of data regarding connections between a plurality of computers 12 belonging to an organization and a plurality of websites 16 outside the organization, each entry being associated with the actions of one computer 12. A plurality of features may be predetermined by software programmers or data scientists before executing the methods or operating the computing device 10 described herein. The features may include each of the fields of the data in each entry of the log files. In addition, some features may include combinations of two or more of the fields.

Furthermore, features may be derived from the data. For example, the timestamp of the transaction may be recorded in a form that includes the date and the time of day as a single, combined unit. From the timestamp, features such as a day of week, an hour of day, AM/PM, etc. may be determined. In various embodiments, numeric values may also be assigned to the data of fields that are text by default. For example, the values of the data protocol, the computer location, the computer type, and others may be stored as text. A unique numeric value may be assigned to each unique text value for each field. Once the data is properly prepared and formatted, the features which are most likely to contain anomalous data may be determined by executing a plurality of algorithms or processes. The algorithms or processes may be executed in any order or may be executed at roughly the same time.

Referring to steps 102-104, a time series decomposition algorithm may be executed on a portion of a plurality of predetermined features of the data to determine one or more outlying values for each computer 12 for a portion of the features for each of a plurality of time periods. Time-based features may include a number of connections to websites 16 made or attempted per time period for each computer 12, a number of bytes sent or received for all of the transactions per time period by each computer 12, and the like. Exemplary time periods include a day, a week, a month, etc.

In executing the S-H-ESD algorithm, the following steps may be performed for each feature for each computer 12 for each time period: determine the periodicity or seasonality component for all of the data of the time period: split the data into non-overlapping windows, and for each window: extract the seasonality component utilizing seasonal trend decomposition using loess (STL), compute the median, compute the residuals, and execute extreme studentized deviates with median absolute deviation (MAD). Execution of the S-H-ESD algorithm may generate one or more outlying values of data for each feature for each computer 12 for each time period, as well as the times at which the outlying data was recorded.

The outlying values for all computers 12 may be compared to one another for each feature and time period combination. Alternatively, the outlying values for computers 12 in certain groups, such as specific file or mail servers, may be compared to one another. Statistical parameters, such as a mean and a confidence interval for the outlying values for the computers 12 for each feature and time period combination, may be calculated. A p-value (based upon a z-score) may be calculated, to determine the deviation from the mean value for each computer 12 for each feature and time period combination. A first feature score may be calculated as: $(1-\text{p-value})\times 100$, for each p-value that is calculated. A first list of features may be generated to include each feature associated with the first feature scores that are greater than a first threshold. Alternatively, the first list of features may include a fixed number of features, such as the top ten highest scoring features.

Referring to steps 105 and 106, a breakout detection algorithm, such as e-divisive with medians, may be executed on a portion of the features to calculate a probability of a breakout of a particular feature having occurred on a particular computer 12 for one time period. When executing the breakout detection algorithm, points in time may be determined where the data changes abruptly from one steady-state value to another steady-state value. For example, the times (including, for example, the date and hour), if any, may be determined at which the steady-state value of connections to websites 16 made or attempted by a particular computer 12 increased or decreased by a threshold amount. It is possible that some computers 12 will have no breakout activity. In addition or instead, a probability of whether a breakout of a certain feature has occurred on a given computer 12 may be determined or calculated. A second list of features may be generated to include those features associated with a breakout probability greater than a second threshold. Alternatively, the second list of features may include a fixed number of features, such as the top ten features with the highest breakout probability.

Referring to steps 107-109, a first plurality of data structures may be created, one data structure for a traffic dispersion graph for each of a plurality of time periods, each traffic dispersion graph including a plurality of connected points illustrating communication between the computers 12 and the websites 16. In various embodiments, the graphs may not actually be rendered, drawn, or plotted on, say, a computer monitor, but instead the data structures may simply be created from which the graphs could be rendered.

Referring to the graph of FIG. 2, plotted for illustration purposes, each computer 12 and each website 16 may have a node on each graph. A line, or edge, may be drawn from each computer 12 to the website 16 the computer 12 tries to contact in a time period of, say, ten minutes, thirty minutes, an hour, or so forth. One graph may be created for each time period. Typically, most of the computers 12 contact one or more of a small group of websites 16. This combination of computers 12 and websites 16 forms a subgraph called a "giant connected component" 28. However, there is usually a small percentage of computers 12 that do not try to contact the websites 16 which belong to the giant connected component 28 and instead try to contact other websites 16, or perhaps do not contact any websites 16 at all. Each grouping of computers 12 and the websites 16 to which they are connected form a structure called a "non-GCC subgraph" 30. The traffic dispersion graph for each time period may include one giant connected component 28 and one or more non-GCC subgraphs 30, wherein there is one giant connected component 28 and one non-GCC subgraph 30.

After the data structures have been created, for which multiple traffic dispersion graphs could be plotted, data may be determined for features which are derived from the graphs. For example, the data may be determined for a first feature that includes a number of times a computer 12 is plotted in a non-GCC subgraph 30, which may be determined for each computer 12. The data may be determined for a second feature that includes an average size (number of nodes) of a non-GCC subgraph 30 for each graph. A third list of features may be created to include those features for which non-trivial, or significant, results have been determined. In the case of the first feature, if any of the computers 12 has been plotted in a non-GCC subgraph 30 more than a certain number of times, then the first feature may be included in the third list. In the case of the second feature, if the average size of the non-GCC subgraphs 30 for each graph is greater than a certain number, then the second feature may be included in the third list. The threshold for each feature to be included in the list may be different.

Referring to steps 110-112, a first autoencoder may be implemented to encode original data of each entry and decode the encoded data. The first autoencoder includes one or more hidden layers, each layer including a plurality of nodes, which perform parallel computations to encode the data, usually so that the coded data has fewer values than the original data, and then decode the coded data in order to reconstruct the original data as closely as possible. An exemplary first autoencoder includes two hidden layers with twenty nodes each. An example of one of the computations for encoding may include: $z=\sigma_1(Wx+b)$, wherein z is a data point of the hidden layer, $\sigma_1$ is a first sigmoid function, W is a weight coefficient, x is the original data, and b is a bias value. An example of one of the computations for decoding may include: $x'=\sigma_2(W'z+b')$, wherein x' is a decoded data point, $\sigma_2$ is a second sigmoid function, W' is a weight coefficient, z is the encoded data, and b' is a bias value. W' and b' may be related to W and b, respectively, through matrix transpose or similar functions. In practice, each entry of the log file may be autoencoded, wherein each entry includes a portion of the total number of features. Thus, the first autoencoder tries to recreate the data of each feature or field of the entry by reading in the data from the log files, performing the calculations for coding the data, and then performing the calculations for decoding the data.

While implementing the first autoencoder, an error level may be calculated, such as a mean squared error, for each use of the first autoencoder, wherein the value of the error level varies according to the degree of similarity between the original data and the reconstructed data from the first autoencoder. That is, an error level may be calculated for the reconstruction of the data for each entry. Typically, a greater error level corresponds to a lower degree of similarity between the original data and the data from the first autoencoder that has been autoencoded. The error level is also an indication of anomalous behavior of one or more computers, wherein a value of the error level greater than a certain threshold indicates that the data had one or more anomalies. A list of entries (or indices of entries) may be created for which the error level of autoencoding the entry was greater than a certain threshold.

Referring to step 113, a random forest regressor may be implemented to create a third list of features to include the features which contributed most to the values of the error levels of the entries in the first list of entries from the autoencoder. The random forest regressor includes a plurality of decision trees, wherein each decision tree is configured to make a classification or a prediction. The random forest regressor may be used to predict the features that contributed the most to, or had the greatest influence on, the value of the error level determined by the first autoencoder for each entry of the log file that was implemented on the first autoencoder. The random forest regressor may be executed only on those entries whose error level is greater than a third threshold value. After executing the random forest regressor, a ranking of the features may be produced which contributed to the values of the error levels determined by the first autoencoder.

Referring to steps 114 and 115, a second plurality of data structures may be created, one data structure to implement a K-means clustering plot, each plot including one or more clusters of data points, each cluster including a centroid and each data point representing one computer 12. The K-means clustering algorithm may be executed on the features from the first, second, third, or fourth lists of features and may involve plotting the data from the log files corresponding to the features. In various embodiments, data may not actually be rendered, drawn, or plotted on, say, a computer monitor, but instead the data structures may simply be created from which plots could be rendered. Examples of the features may include the type of computer 12, whether or not the first portion of the IP address of the computer 12 has a value of 10, whether or not the communication from the computer 12 to the website 16 was allowed, the IP address of the computer, the source port of the firewall or proxy server 14, the destination port of the firewall or proxy server 14, the protocol of the message, and so forth.

Typically, the data corresponding to the features for a certain time period may be processed, such as an hour, a day, a week, etc. Two-dimensional coordinates, such as (x, y), may be assigned to the data of each feature to create a plurality of points. An example of a plot of the points with assigned coordinates is shown in FIG. 3, wherein each data point is indicated with a plus sign. A number of clusters may be chosen or determined, wherein each cluster is associated with a centroid whose position within the data of the feature is chosen arbitrarily. Alternatively, the number of clusters may be chosen utilizing an elbow method or an elbow graph. The points are closest to each centroid may be determined and those points may be assigned to the centroid. Each centroid may then be positioned to be in the center of the assigned points.

Given that the centroids have moved, the points which are closest to each newly-positioned centroid may be determined and those points may be assigned to the centroid. Each centroid may again be repositioned to be in the center of the newly-assigned points. The repositioning and assigning process may be repeated until the distance that each centroid is moved is less than a certain threshold. The points whose distance to each centroid is less than a threshold value may be discarded.

Referring to steps 116 and 117, a density-based spatial clustering of applications with noise (DBSCAN) algorithm may be implemented on the remaining data points in each cluster to determine outlier data points. For each point, how many other points lie within a threshold radius may be determined. Those points whose distance to any other point is greater than the threshold radius or which do not have any other points within the threshold radius may be determined to be outliers. Each data point represents a particular computer 12, and the outlier data points represent computers 12 whose behavior is anomalous. Those computers 12 represented by outlier data points may be reported as exhibiting anomalous behavior.

Referring to steps 119-124, a third plurality of data structures may be created, one data structure for each of a plurality of egonet graphs, each egonet graph illustrating communication between the computers 12 and the websites 16 for a certain time period and including a plurality of egonets 36. Each egonet graph may include a plurality of nodes 32, with each node 32 representing a computer 12 or a website 16, and a plurality of weighted edges 34, with each edge 34 being drawn from one computer 12 to one website 16 which the computer 12 contacted within a certain time period. An exemplary time period may be an hour or a day. An egonet 36 may include one node 32 and all of the edges 34 and other nodes 32 to which the first node 32 is connected, so that each egonet graph may include a plurality of egonets 36—one egonet 36 per node 32. One egonet graph may be created for each time period included in the proxy server log files. The weight of each edge 34 may equal or correspond to the number of blocked connections during the time period, although other parameters may be used such as the number of times the website 16 was contacted.

In various embodiments, data may not actually be rendered, drawn, or plotted on, say, a computer monitor, but instead the data structures may simply be created from which plots could be rendered. However, for the purposes of illustration, an exemplary egonet graph is shown in FIG. 4, wherein there are a plurality of nodes 32 and edges 34, with each edge having a weight indicated by a number. Furthermore, each node 32 and its connected edges 34 form one egonet 36 with some egonets 36 representing or being associated with each computer 12 and other egonets 36 representing or being associated with each website 16.

For each egonet of one egonet graph, a weighted adjacency matrix may be determined and an eigenvalue for each matrix may be calculated. A "Heavy Vicinity" plot and a "Dominant Edge" plot may be created to accompany each egonet graph. The Heavy Vicinity plots the total weight vs. the number of edges for each egonet 36 representing a computer 12, as shown in the example of FIG. 5. The points that are plotted should form a power law curve. A curve fitter may be utilized to determine the shape and position of the curve. Those points which are farthest away from the curve may be determined and may be labeled or identified as outliers, wherein each point corresponds to a computer 12 whose behavior may be anomalous.

The Dominant Edge plots the eigenvalue vs. the total weight for each egonet 36 representing a computer 12, as shown in the example of FIG. 6. Like the Heavy Vicinity plot, the points of the Dominant Edge plot should form a power law curve. A curve fitter may again be utilized to determine the shape and position of the curve. Those points which are farthest away from the curve may be determined and may be labeled or identified as outliers, wherein each point corresponds to a computer 12 whose behavior may be anomalous. A second list may be created to include the computers 12 determined as anomalous by the Heavy Vicinity and Dominant Edge plots. The second list may be forwarded to system administrators.

Referring to steps 125-127, a second autoencoder may be implemented to encode and decode each entry of data from the log files, wherein each entry includes only those features from the first, second, or third list of features. The second autoencoder may have the same construction, such as hidden layers, etc., as the first autoencoder or it may have a different construction. The data that is input into the second autoencoder may include all, or most, of the entries of the data log files, except that each entry includes only the features that were from the first, second, or third lists of features generated by the processes discussed above. The entries may additionally or alternatively include only those features which were ranked by the random forest regressor as contributing to the values of the error levels determined by the first autoencoder.

The second autoencoder may be implemented by reading the data, encoding the data, and then decoding the data. An error level may further be calculated for each entry that is encoded and decoded, wherein the error level corresponds to the similarity between the input data and the output data. The entries which have an error level that is greater than a predetermined threshold may be determined and considered as outliers. Since each entry is generated by, or associated with, a particular computer 12, the computers 12 associated with outlier entries are likely behaving anomalously. A third list may be created to include the computers 12 associated with outliers. The third list may be forwarded to system administrators.

Exemplary Computer-Implemented Method for Determining Features of a Dataset that are Indicative of Anomalous Behavior of One or More Computers in a Large Group of Computers In a first aspect, a computer-implemented method for determining features of a dataset that are indicative of anomalous behavior of one or more computers in a large group of computers may be provided. The method may include, via one or more processors and/or transceivers: (1) receiving log files including a plurality of entries of data regarding connections between a plurality of computers belonging to an organization and a plurality of websites outside the organization, each entry being associated with the actions of one computer; (2) determining a plurality of embedded features that are included in each entry; (3) determining a plurality of derived features that are extracted from the embedded features; (4) creating a plurality of features including the embedded features and the derived features; (5) executing a time series decomposition algorithm on a portion of the features of the data to generate a first list of features; (6) implementing a plurality of traffic dispersion graphs to generate a second list of features; and/or (7) implementing an autoencoder and a random forest regressor to generate a third list of features. The method may include additional, fewer, or alternative actions, including those discussed elsewhere herein.

For instance, the time series decomposition algorithm is executed on a portion of the features of the data to determine one or more outlying values for each computer for a portion of the features for each of a plurality of time periods; executing the time series decomposition algorithm includes calculating a first feature score for each computer for each feature and time period combination, and generating the first list of features to include each feature associated with the first feature scores that are greater than a first threshold. Implementing the traffic dispersion graphs includes creating a first plurality of data structures, one data structure for one traffic dispersion graph for each of a plurality of time periods, each traffic dispersion graph including a plurality of connected points illustrating communication between the computers and the websites, determining the computers for which the connected points form a giant connected component and the computers not in the giant connected component for each traffic dispersion graph, and generating the second list of features that includes which computers are not in the giant connected component on a repeated basis. The second list of features further includes an average number of computers not in the giant connected component for each traffic dispersion graph. Implementing the autoencoder includes encoding original data of each entry and decoding the encoded data, calculating an error level between the original data and the decoded data for each entry of data, each entry including all of the features, and generating a first list of entries that includes the entries for which the error level is greater than a second threshold. Implementing the autoencoder further includes implementing a plurality of decision trees to generate the third list of features to include the features which contributed most to the values of the error levels of the entries in the first list of entries from the autoencoder. The third list of features includes a ranking of features which contributed most to the values of the error levels of the entries in the first list of entries.

Exemplary Computer-Readable Medium for Determining Features of a Dataset that are Indicative of Anomalous Behavior of One or More Computers in a Large Group of Computers In another aspect, a computer-readable medium for determining features of a dataset that are indicative of anomalous behavior of one or more computers in a large group of computers may be provided. The computer-readable medium may include an executable program stored thereon, wherein the program instructs a processing element of a computing device to perform the following: (1) receiving log files including a plurality of entries of data regarding connections between a plurality of computers belonging to an organization and a plurality of websites outside the organization, each entry being associated with the actions of one computer; (2) determining a plurality of embedded features that are included in each entry; (3) determining a plurality of derived features that are extracted from the embedded features; (4) creating a plurality of features including the embedded features and the derived features; (5) executing a time series decomposition algorithm on a portion of the features of the data to generate a first list of features; (6) implementing a plurality of traffic dispersion graphs to generate a second list of features; and/or (7) implementing an autoencoder and a random forest regressor to generate a third list of features. The program stored on the computer-readable medium may instruct the processing element to perform additional, fewer, or alternative actions, including those discussed elsewhere herein.

For instance, the time series decomposition algorithm is executed on a portion of the features of the data to determine one or more outlying values for each computer for a portion of the features for each of a plurality of time periods; executing the time series decomposition algorithm includes calculating a first feature score for each computer for each feature and time period combination, and generating the first list of features to include each feature associated with the first feature scores that are greater than a first threshold. Implementing the traffic dispersion graphs includes creating a first plurality of data structures, one data structure for one traffic dispersion graph for each of a plurality of time periods, each traffic dispersion graph including a plurality of connected points illustrating communication between the computers and the websites, determining the computers for which the connected points form a giant connected component and the computers not in the giant connected component for each traffic dispersion graph, and generating the second list of features that includes which computers are not in the giant connected component on a repeated basis. The second list of features further includes an average number of computers not in the giant connected component for each traffic dispersion graph. Implementing the autoencoder includes encoding original data of each entry and decoding the encoded data, calculating an error level between the original data and the decoded data for each entry of data, each entry including all of the features, and generating a first list of entries that includes the entries for which the error level is greater than a second threshold. Implementing the autoencoder further includes implementing a plurality of decision trees to generate the third list of features to include the features which contributed most to the values of the error levels of the entries in the first list of entries from the autoencoder. The third list of features includes a ranking of features which contributed most to the values of the error levels of the entries in the first list of entries.

Exemplary Computing Device for Determining Features of a Dataset that are Indicative of Anomalous Behavior of One or More Computers in a Large Group of Computers In yet another aspect, a computing device for determining features of a dataset that are indicative of anomalous behavior of one or more computers in a large group of computers may be provided. The computing device may include a communication element, a memory element, and a processing element. The communication element may receive and transmit communications to and from a plurality of servers and computers within an organization. The memory element may be electronically coupled to the communication element and may store executable instructions. The processing element may be electronically coupled to the communication element and the memory element. The processing element may be configured to receive log files including a plurality of entries of data regarding connections between a plurality of computers belonging to an organization and a plurality of websites outside the organization, each entry being associated with the actions of one computer; determine a plurality of embedded features that are included in each entry; determine a plurality of derived features that are extracted from the embedded features; create a plurality of features including the embedded features and the derived features; execute a time series decomposition algorithm on a portion of the features of the data to generate a first list of features; implement a plurality of traffic dispersion graphs to generate a second list of features; and/or implement an autoencoder and a random forest regressor to generate a third list of features. The computing device may include additional, fewer, or alternate components and/or functionality, including that discussed elsewhere herein.

For instance, the time series decomposition algorithm is executed on a portion of the features of the data to determine one or more outlying values for each computer for a portion of the features for each of a plurality of time periods; executing the time series decomposition algorithm includes calculating a first feature score for each computer for each feature and time period combination, and generating the first list of features to include each feature associated with the first feature scores that are greater than a first threshold. Implementing the traffic dispersion graphs includes creating a first plurality of data structures, one data structure for one traffic dispersion graph for each of a plurality of time periods, each traffic dispersion graph including a plurality of connected points illustrating communication between the computers and the websites, determining the computers for which the connected points form a giant connected component and the computers not in the giant connected component for each traffic dispersion graph, and generating the second list of features that includes which computers are not in the giant connected component on a repeated basis. The second list of features further includes an average number of computers not in the giant connected component for each traffic dispersion graph. Implementing the autoencoder includes encoding original data of each entry and decoding the encoded data, calculating an error level between the original data and the decoded data for each entry of data, each entry including all of the features, and generating a first list of entries that includes the entries for which the error level is greater than a second threshold. Implementing the autoencoder further includes implementing a plurality of decision trees to generate the third list of features to include the features which contributed most to the values of the error levels of the entries in the first list of entries from the autoencoder. The third list of features includes a ranking of features which contributed most to the values of the error levels of the entries in the first list of entries.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

We claim:

1. A computer-implemented method for determining features of a dataset that are indicative of anomalous behavior of one or more computers, the computer-implemented method comprising, via one or more processors and/or transceivers:
   receiving log files including a plurality of entries of data;
   creating features of the plurality of entries of data including embedded features that are included in each entry and derived features that are extracted from the embedded features;
   executing a time series decomposition algorithm on a portion of the features of the plurality of entries of data to generate a first list of features;
   implementing a plurality of traffic dispersion graphs to generate a second list of features; and
   implementing an autoencoder and a random forest regressor to generate a third list of features.

2. The computer-implemented method of claim 1, wherein the time series decomposition algorithm is executed on a portion of the features of the plurality of entries of data to determine one or more outlying values for a computer for a portion of the features of the plurality of entries of data for each of a plurality of time periods.

3. The computer-implemented method of claim 2, wherein executing the time series decomposition algorithm includes
   calculating first feature scores for a computer including a first feature score for each feature and time period combination, and
   generating the first list of features to include each feature associated with the first feature scores that are greater than a first threshold.

4. The computer-implemented method of claim 1, wherein implementing the plurality of traffic dispersion graphs includes
   creating a first plurality of data structures, one data structure for one traffic dispersion graph for each of a plurality of time periods, each traffic dispersion graph including a plurality of connected points illustrating communication between several computers and websites,
   determining a first set of computers for which the plurality of connected points form a giant connected component and a second set of computers not in the giant connected component for each traffic dispersion graph, and
   generating the second list of features that includes which computers are not in the giant connected component on a repeated basis.

5. The computer-implemented method of claim 1, wherein implementing the autoencoder includes
   encoding original data of each entry to produce encoded data and decoding the encoded data,
   calculating an error level value between the original data and the decoded data for each entry of data, each entry including all of the features of the plurality of entries of data, and
   generating a first list of entries that includes the entries for which the error level value is greater than a second threshold.

6. The computer-implemented method of claim 5, wherein implementing the autoencoder includes implementing a plurality of decision trees to generate the third list of features to include the features of the plurality of entries of data which contributed most to the error level values of the entries in the first list of entries from the autoencoder.

7. The computer-implemented method of claim 5, wherein the third list of features includes a ranking of features which contributed most to the error level values of entries in the first list of entries.

8. A non-transitory computer-readable medium with an executable program stored thereon for determining features of a dataset that are indicative of anomalous behavior of one or more computers, wherein the program instructs a processing element of a computing device to perform the following:
receiving log files including a plurality of entries of data;
creating features of the plurality of entries of data including embedded features that are included in each entry and derived features that are extracted from the embedded features;
executing a time series decomposition algorithm on a portion of the features of the plurality of entries of data to generate a first list of features;
implementing a plurality of traffic dispersion graphs to generate a second list of features; and
implementing an autoencoder and a random forest regressor to generate a third list of features.

9. The non-transitory computer-readable medium of claim 8, wherein the time series decomposition algorithm is executed on a portion of the features of the plurality of entries of data to determine one or more outlying values for a computer for a portion of the features of the plurality of entries of data for each of a plurality of time periods.

10. The non-transitory computer-readable medium of claim 9, wherein executing the time series decomposition algorithm includes
calculating first feature scores for a computer including a first feature score for each feature and time period combination, and
generating the first list of features to include each feature associated with the first feature scores that are greater than a first threshold.

11. The non-transitory computer-readable medium of claim 8, wherein implementing the traffic dispersion graphs includes
creating a first plurality of data structures, one data structure for one traffic dispersion graph for each of a plurality of time periods, each traffic dispersion graph including a plurality of connected points illustrating communication between several computers and websites,
determining a first set of computers for which the plurality of connected points form a giant connected component and a second set of computers not in the giant connected component for each traffic dispersion graph, and
generating the second list of features that includes which computers are not in the giant connected component on a repeated basis.

12. The non-transitory computer-readable medium of claim 8, wherein implementing the autoencoder includes
encoding original data of each entry to produce encoded data and decoding the encoded data,
calculating an error level value between the original data and the decoded data for each entry of data, each entry including all of the features of the plurality of entries of data, and
generating a first list of entries that includes the entries for which the error level value is greater than a second threshold.

13. The non-transitory computer-readable medium of claim 12, wherein implementing the autoencoder includes implementing a plurality of decision trees to generate the third list of features to include the features of the plurality of entries of data which contributed most to the error level values of the entries in the first list of entries from the autoencoder.

14. The non-transitory computer-readable medium of claim 13, wherein the third list of features includes a ranking of features which contributed most to the error level values of entries in the first list of entries.

15. A computing device for determining features of a dataset that are indicative of anomalous behavior of one or more computers, the device comprising:
a communication element configured to receive and transmit communications to and from a plurality of servers and computers within an organization;
a memory element electronically coupled to the communication element, the memory element configured to store executable instructions; and
a processing element electronically coupled to the communication element and the memory element, the processing element configured to—
receive log files including a plurality of entries of data;
create features of the plurality of entries of data including embedded features that are included in each entry and derived features that are extracted from the embedded features;
execute a time series decomposition algorithm on a portion of the features of the plurality of entries of data to generate a first list of features;
implement a plurality of traffic dispersion graphs to generate a second list of features; and
implement an autoencoder and a random forest regressor to generate a third list of features.

16. The computing device of claim 15, wherein the time series decomposition algorithm is executed on a portion of the features of the plurality of entries of data to determine one or more outlying values for a computer for a portion of the features of the plurality of entries of data for each of a plurality of time periods.

17. The computing device of claim 16, wherein executing the time series decomposition algorithm includes
calculating first feature scores for a computer including a first feature score for each feature and time period combination, and generating the first list of features to include each feature associated with the first feature scores that are greater than a first threshold.

18. The computing device of claim 17, wherein implementing the traffic dispersion graphs includes
creating a first plurality of data structures, one data structure for one traffic dispersion graph for each of a plurality of time periods, each traffic dispersion graph including a plurality of connected points illustrating communication between the computers and the websites,
determining a first set of computers for which the plurality of connected points form a giant connected component and a second set of computers not in the giant connected component for each traffic dispersion graph, and
generating the second list of features that includes which computers are not in the giant connected component on a repeated basis.

19. The computing device of claim 15, wherein implementing the autoencoder includes
- encoding original data of each entry to produce encoded data and decoding the encoded data,
- calculating an error level value between the original data and the decoded data for each entry of data, each entry including all of the features of the plurality of entries of data, and
- generating a first list of entries that includes the entries for which the error level value is greater than a second threshold.

20. The computing device of claim 19, wherein implementing the autoencoder includes implementing a plurality of decision trees to generate the third list of features to include the features of the plurality of entries of data which contributed most to the error level values of entries in the first list of entries from the autoencoder and to further include a ranking of features which contributed most to the error level values of entries in the first list of entries.

\* \* \* \* \*